(12) United States Patent
Chen et al.

(10) Patent No.: US 11,261,886 B1
(45) Date of Patent: Mar. 1, 2022

(54) PNEUMATIC CYLINDER AND MECHANICAL APPARATUS USING THE SAME

(71) Applicant: KING YUAN FU PACKAGING CO., LTD., New Taipei (TW)

(72) Inventors: Yu-Hui Chen, New Taipei (TW); Ching-Chuan Huang, New Taipei (TW)

(73) Assignee: KING YUAN FU PACKAGING CO., LTD., New Taipei (TW)

( * ) Notice: Subject to any disclaimer, the term of this patent is extended or adjusted under 35 U.S.C. 154(b) by 0 days.

(21) Appl. No.: 17/347,548

(22) Filed: Jun. 14, 2021

(51) Int. Cl.
F15B 15/22 (2006.01)
F16J 10/04 (2006.01)
F15B 15/14 (2006.01)
F15B 15/17 (2006.01)

(52) U.S. Cl.
CPC ............ *F15B 15/223* (2013.01); *F15B 15/14* (2013.01); *F15B 15/1419* (2013.01); *F15B 15/17* (2013.01); *F15B 15/224* (2013.01); *F15B 15/226* (2013.01); *F16J 10/04* (2013.01)

(58) Field of Classification Search
None
See application file for complete search history.

(56) References Cited

U.S. PATENT DOCUMENTS

| | | | | |
|---|---|---|---|---|
| 3,933,080 A * | 1/1976 | Corrie | .............. | F15B 5/00 91/394 |
| 4,076,103 A * | 2/1978 | Wallis | .............. | F16F 9/3278 184/25 |
| 4,765,227 A * | 8/1988 | Balazs | .............. | B21D 24/02 137/493.2 |
| 5,415,303 A * | 5/1995 | Hodges | .............. | B61G 9/08 137/536 |
| 6,357,612 B1 * | 3/2002 | Monaco | .............. | B61G 9/08 188/315 |
| 6,520,065 B2 * | 2/2003 | Sakurai | .............. | F15B 15/2807 92/5 R |
| 6,796,159 B2 * | 9/2004 | Kelm | .............. | B21D 24/02 72/351 |
| 8,438,966 B2 * | 5/2013 | Rauscher | .............. | F16J 1/008 92/246 |
| 10,927,860 B2 * | 2/2021 | Kudo | .............. | F15B 15/1447 |

FOREIGN PATENT DOCUMENTS

DE 2712669 A1 * 9/1978 ............ F15B 15/226

* cited by examiner

*Primary Examiner* — Michael Leslie
(74) *Attorney, Agent, or Firm* — Chun-Ming Shih; HDLS IPR Services (57) ABSTRACT

A pneumatic cylinder includes a cylinder body, a piston assembly, a connecting rod, and at least one pressure-relief valve. The cylinder body is formed with a cylinder chamber, and has an exterior disposed with at least one inlet-outlet passage and at least one pressure-relief opening, wherein the inlet-outlet passage is connected to the cylinder chamber. The piston assembly is contained within the cylinder chamber. The connecting rod is connected to the piston assembly, and protrudes out from the cylinder body. The pressure-relief valve is disposed in the pressure-relief opening, and has two ends connected to an outside of the pneumatic cylinder and the cylinder chamber respectively. When a gas pressure within the cylinder chamber is greater than a threshold value, the pressure-relief valve works to allow the cylinder chamber connecting to the outside for pressure relief.

16 Claims, 6 Drawing Sheets

FIG. 6

PNEUMATIC CYLINDER AND MECHANICAL APPARATUS USING THE SAME

CROSS-REFERENCE TO RELATED APPLICATIONS

This non-provisional application claims priority claim under 35 U.S.C. § 119(a) on Taiwan Utility Model No. 110201548 filed on Feb. 8, 2021, the entire contents of which are incorporated herein by reference.

TECHNICAL FIELD

The present disclosure relates to a pneumatic cylinder, more particularly a pneumatic cylinder with at least one pressure-relief valve for preventing cylinder explosion, and a mechanical apparatus using the pneumatic cylinder.

BACKGROUND

Many types of mechanical apparatus, such as machine tools, automobiles or locomotives, etc., which all employ pneumatic cylinders. A pneumatic cylinder mainly has a cylinder body, a piston assembly and a connecting rod. The cylinder body is formed with a cylinder chamber therein, for containing the piston assembly. The cylinder body is disposed with at least one inlet/outlet, wherein the inlet/outlet and the cylinder chamber have a spatial communication therebetween. Via intake and exhaust from the inlet/outlet, the piston assembly within the pneumatic cylinder can be driven by a change of pressure, such that to move the connecting rod connected to the piston assembly. As so, a bearer connected to the connecting rod (e.g. carrier, wheel shaft, conveyor belt or other type of bearers), which is driven to move along with the piston (such as to move and/or turn).

However, when the bearer has larger damping (such as when the carrier is loaded with heavier material, workpiece, or held back by some leftover scraps), more air or gas must be transferred into the cylinder chamber to be able to move the bearer, however such process may cause excessive air or gas pressure to the cylinder body, and result in cylinder explosion. Also, when there is a need to rapidly move the bearer, a large amount of air or gas is instantly inputted into the cylinder chamber, this too can cause excessive air pressure to the cylinder body, and result in cylinder explosion. According to the abovementioned description, there is a need to improve the current pneumatic cylinder, for preventing the cylinder explosion.

SUMMARY

According to at least one object from the abovementioned need of improvement, one embodiment of the present disclosure is to provide a pneumatic cylinder which has at least one pressure-relief valve, for preventing the cylinder chamber of the pneumatic cylinder from suffering excessive air or gas pressure and further preventing cylinder explosion. Also, one embodiment of the disclosure is to provide a mechanical apparatus using the abovementioned pneumatic cylinder.

According to one object, the present disclosure is to provide a pneumatic cylinder, which includes a cylinder body, a piston assembly, a connecting rod and at least one pressure-relief valve. The cylinder body is formed with a cylinder chamber therein, and has an exterior disposed with at least one inlet-outlet passage and at least one pressure-relief opening, wherein the inlet-outlet passage is connected to the cylinder chamber. The piston assembly is contained within the cylinder chamber. The connecting rod is connected to the piston assembly and protrudes from the cylinder body. The pressure-relief valve is disposed within the pressure-relief opening, and has two ends connected to an outside of the pneumatic cylinder and the cylinder chamber respectively. When an air or gas pressure within the cylinder chamber is greater than a threshold value of the pressure-relief valve, the pressure-relief valve works to allow the cylinder chamber connecting to the outside of the pneumatic cylinder, for pressure relief. Therefore, the present disclosure can prevent the cylinder chamber from suffering excessive gas pressure and further causing cylinder explosion.

In one embodiment of the present disclosure, the pressure-relief valve includes a shaft, a flexible block and a resilient member. The flexible block is connected to an end of the shaft that is connected to the cylinder chamber, and the resilient member is disposed to surround the cylinder body, for providing an elastic force to the flexible block.

In one embodiment of the present disclosure, the exterior of the cylinder body includes a first side surface and three second side surfaces corresponding to each other. The at least one inlet-outlet passage becomes two that are respectively disposed on an upper portion and a lower portion of the first side surface of the cylinder body. The pressure-relief opening is disposed on a lower portion of one of the three second side surfaces of the cylinder body. Additionally, the at least one pressure-relief opening may be three respectively disposed on lower portions of the three second side surfaces, and the at least one pressure-relief valve may also be three respectively disposed within the three pressure-relief openings.

In one embodiment of the present disclosure, the connecting rod has a bottom portion, the cylinder body is disposed with a lubricating member therein and on a lateral surface of the bottom portion of the connecting rod.

In one embodiment of the present disclosure, an antiwear member that is disposed between a lateral surface of the piston assembly and an inner-lateral surface of the cylinder body corresponding to the cylinder chamber, for reducing wear of the piston assembly during an operation thereof.

In one embodiment of the present disclosure, the piston assembly includes a piston cylinder and a ring seal. The piston cylinder has a top end connected to the connecting rod. The connecting rod extends upward from the top end of the piston cylinder and penetrates the cylinder body. The ring seal is disposed on the side surface of the piston cylinder, for reducing wear of the piston cylinder during an operation thereof, and for preventing internal gas leakage within the cylinder chamber, which can result in cylinder failure.

In one embodiment of the present disclosure, the pneumatic cylinder is further disposed with a piston cushion on an upper-inner surface and a lower-inner surface of the cylinder body that corresponds to the cylinder chamber, for reducing wear of the piston cylinder and the cylinder body, as the piston cylinder contacts the upper-inner surface and the lower-inner surface of the cylinder body that corresponds to the cylinder chamber, during the operation.

In one embodiment of the present disclosure, the cylinder body is disposed with a plurality of connecting holes, which allow the cylinder chamber, the inlet-outlet passage and an end of the pressure-relief valve to connect to each other.

According to one object of the present disclosure, which is to provide a mechanical apparatus using the abovementioned pneumatic cylinder, and the mechanical apparatus includes a bearer connected to the connecting rod of the pneumatic cylinder.

In one embodiment of the present disclosure, the mechanical apparatus further includes a work tool, for processing a material on the bearer.

To be brief, the present disclosure provides a pneumatic cylinder disposed with a pressure-relief valve within the pressure-relief opening thereof, and a mechanical apparatus using the pneumatic cylinder, thereby able to perform pressure relief for the cylinder chamber when the gas pressure therein reaches a threshold value, such that to prevent the air or gas pressure within the cylinder chamber from becoming excessive and causing cylinder explosion.

BRIEF DESCRIPTION OF THE DRAWINGS

The structure as well as preferred modes of use, further objects, and advantages of this present disclosure will be best understood by referring to the following detailed description of some illustrative embodiments in conjunction with the accompanying drawings, in which.

DETAILED DESCRIPTION OF THE PREFERRED EMBODIMENTS

To clearly understand the objects of the present disclosure, herein to describe and explain details of the present disclosure by following embodiment(s) with the attached drawings.

In one embodiment of the present disclosure, a pneumatic cylinder is provided. The pneumatic cylinder includes a cylinder body, a piston assembly, a connecting rod and at least one pressure-relief valve. The cylinder body is disposed with a cylinder chamber therein, the cylinder chamber is for containing the piston assembly, and the piston assembly is connected to the connecting rod which protrudes out from of the cylinder body. The cylinder body has at least one inlet-outlet passage, the inlet-outlet passage extends through an exterior of the cylinder body and connects to the cylinder chamber. The pressure-relief valve has an end disposed in a pressure-relief opening on the exterior of the cylinder body, and another end connected to the cylinder chamber. The inlet-outlet passage is for transferring air or gas into the cylinder chamber or extracting the air or gas from the cylinder chamber, for driving the piston assembly to make the connecting rod ascend or descend. The pressure-relief valve is a resilient block, when an air or gas pressure within the cylinder chamber is less than a threshold value, the cylinder chamber does not connect to an outside of the pneumatic cylinder via the pressure-relief opening. Also, when the air or gas pressure within the cylinder chamber is greater than the threshold value, the end of the pressure-relief valve connected to the cylinder chamber, which works to move and allow the cylinder chamber to connect to the outside through the pressure-relief opening, for pressure relief and further to prevent cylinder explosion.

Figure 1:
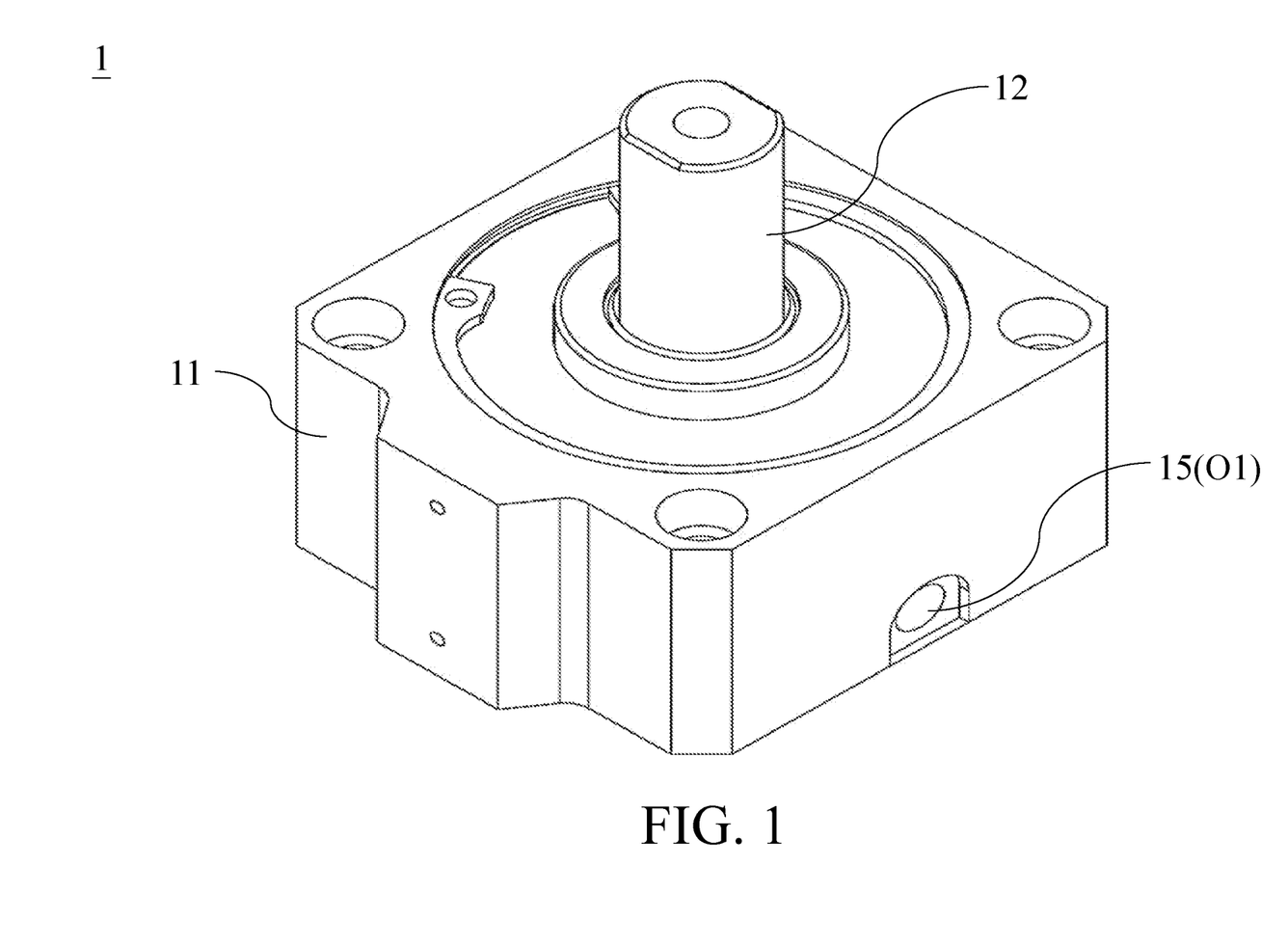
FIG. 1 is a perspective view of a pneumatic cylinder according to one embodiment of the present disclosure.
Figure 2:
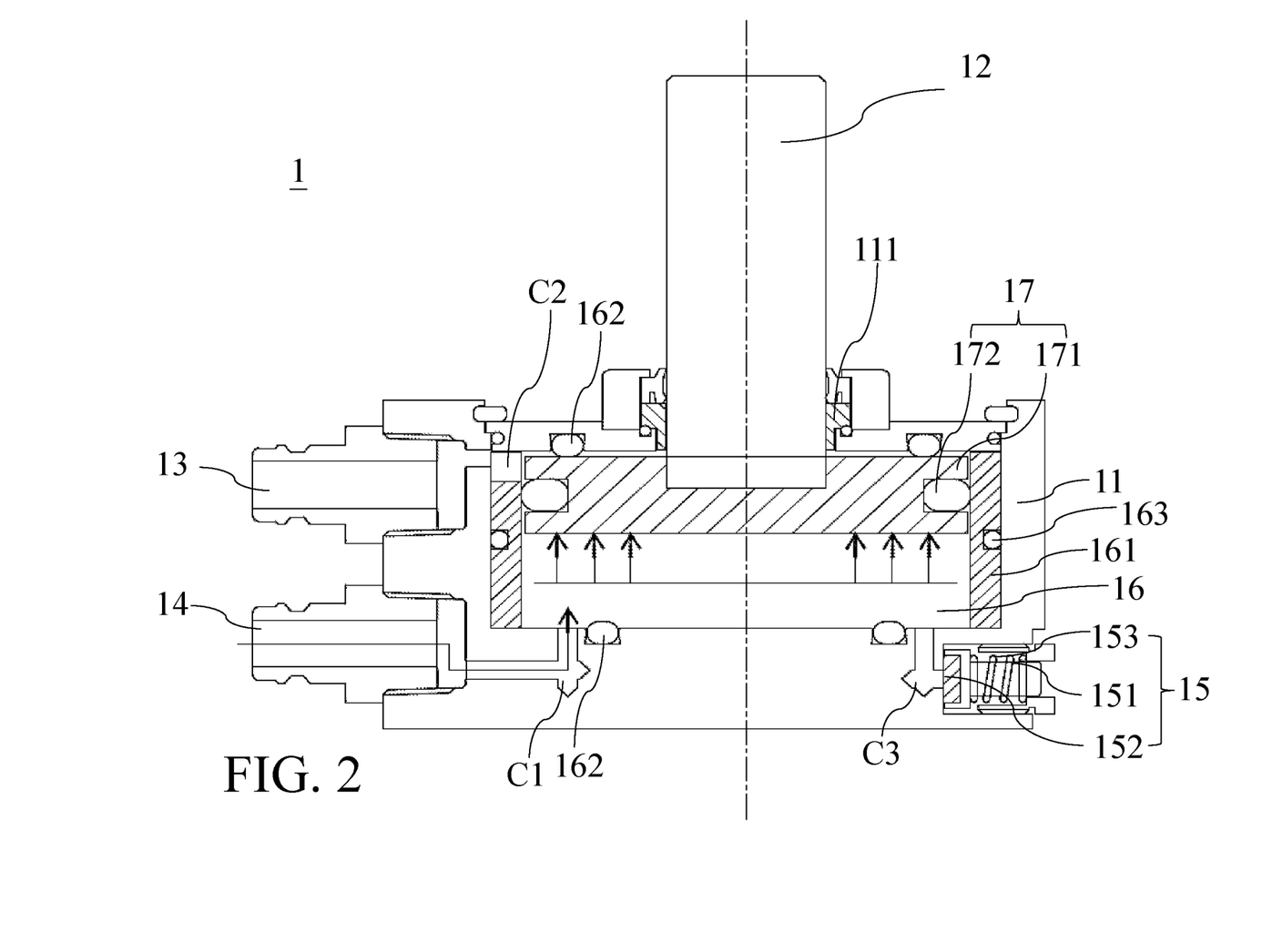
FIG. 2 is a sectional view illustrating an ascending state of a connecting rod during an operation of the pneumatic cylinder, according to one embodiment of the present disclosure.
Figure 3:
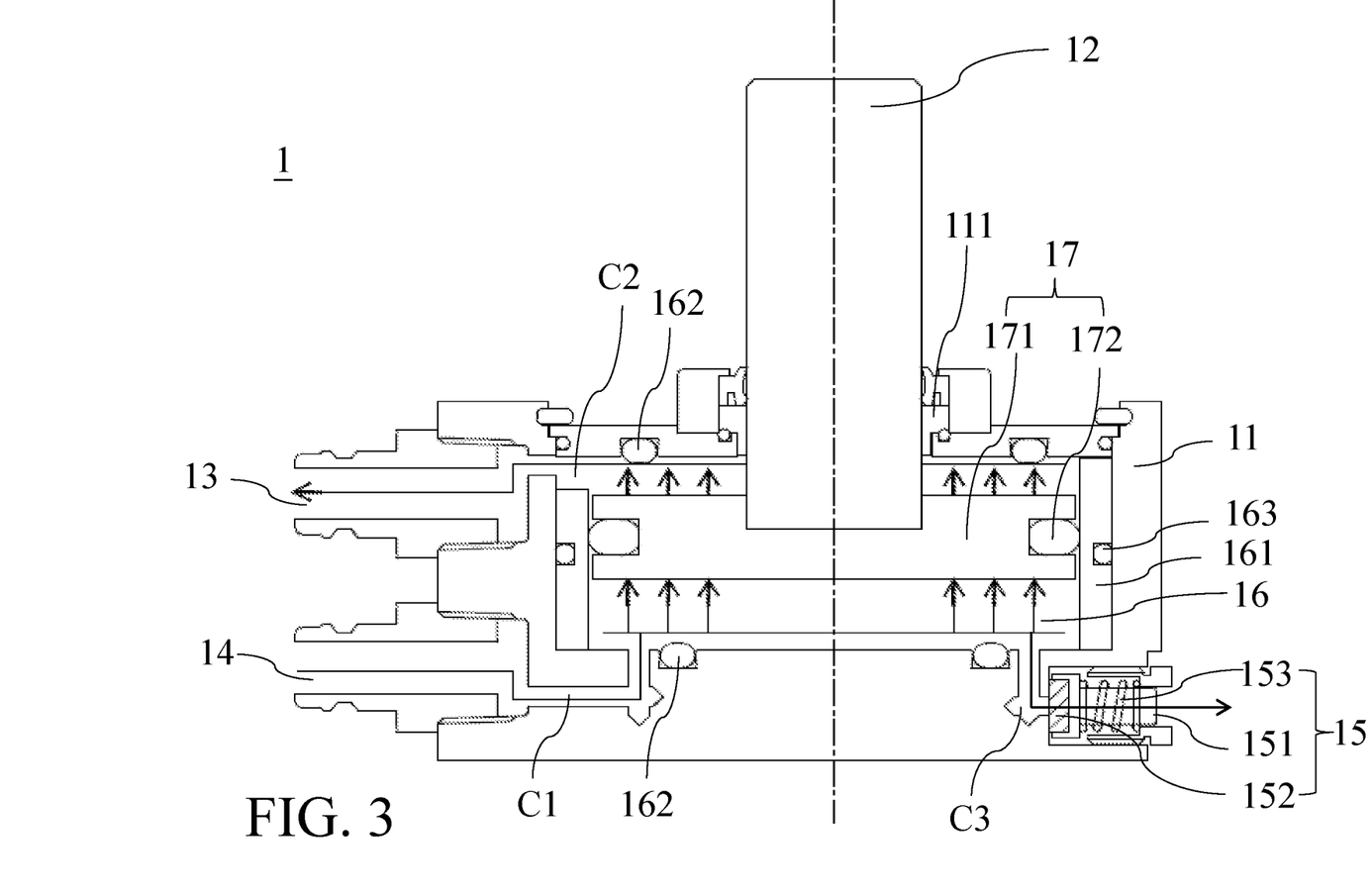
FIG. 3 is a sectional view illustrating the ascending state of the connecting rod and an exhaust from a pressure-relief valve during the operation of the pneumatic cylinder, according to one embodiment of the present disclosure.
Figure 4:
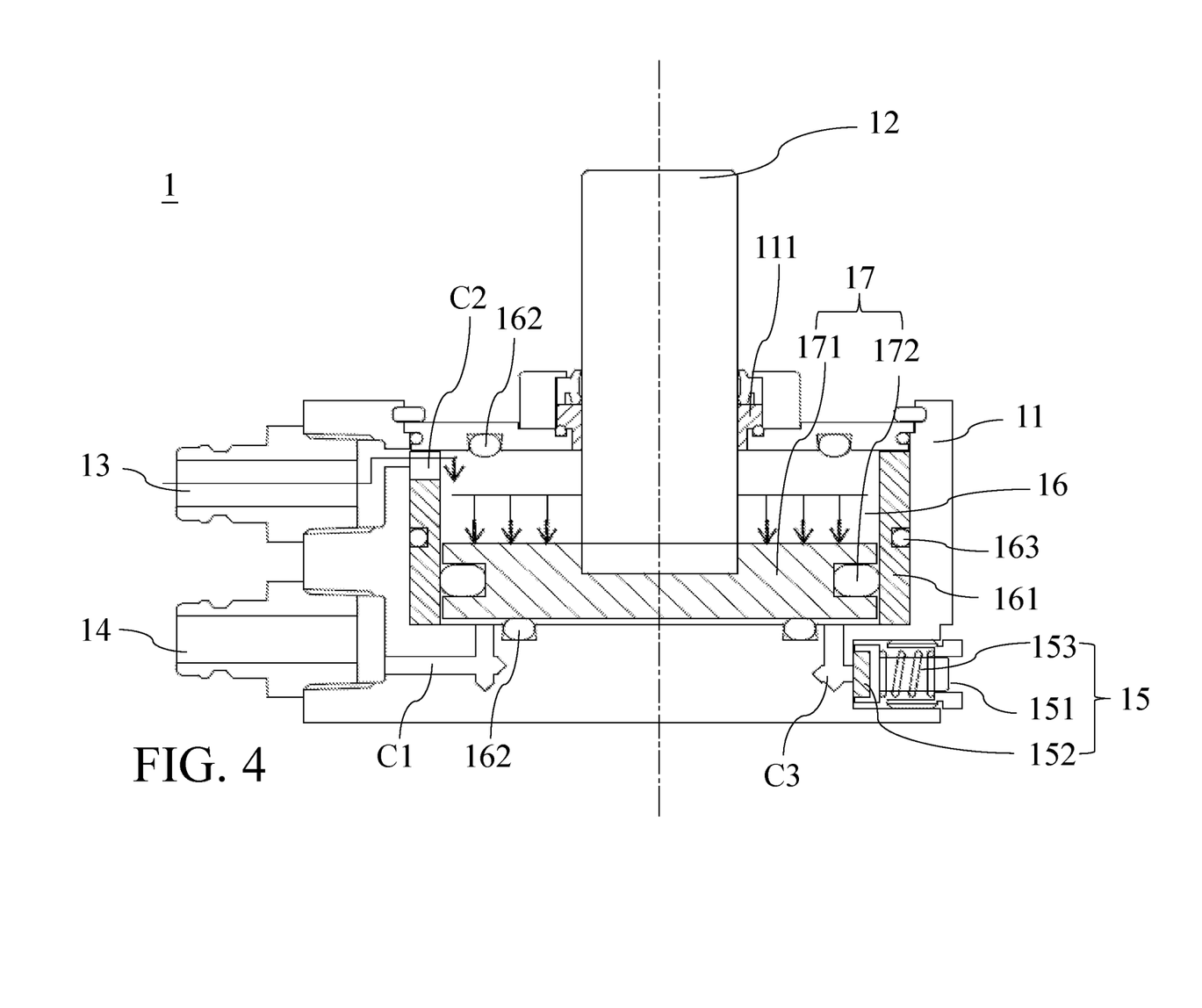
FIG. 4 is a sectional view illustrating a descending state of the connecting rod during the operation of the pneumatic cylinder, according to one embodiment of the present disclosure.
Figure 5:
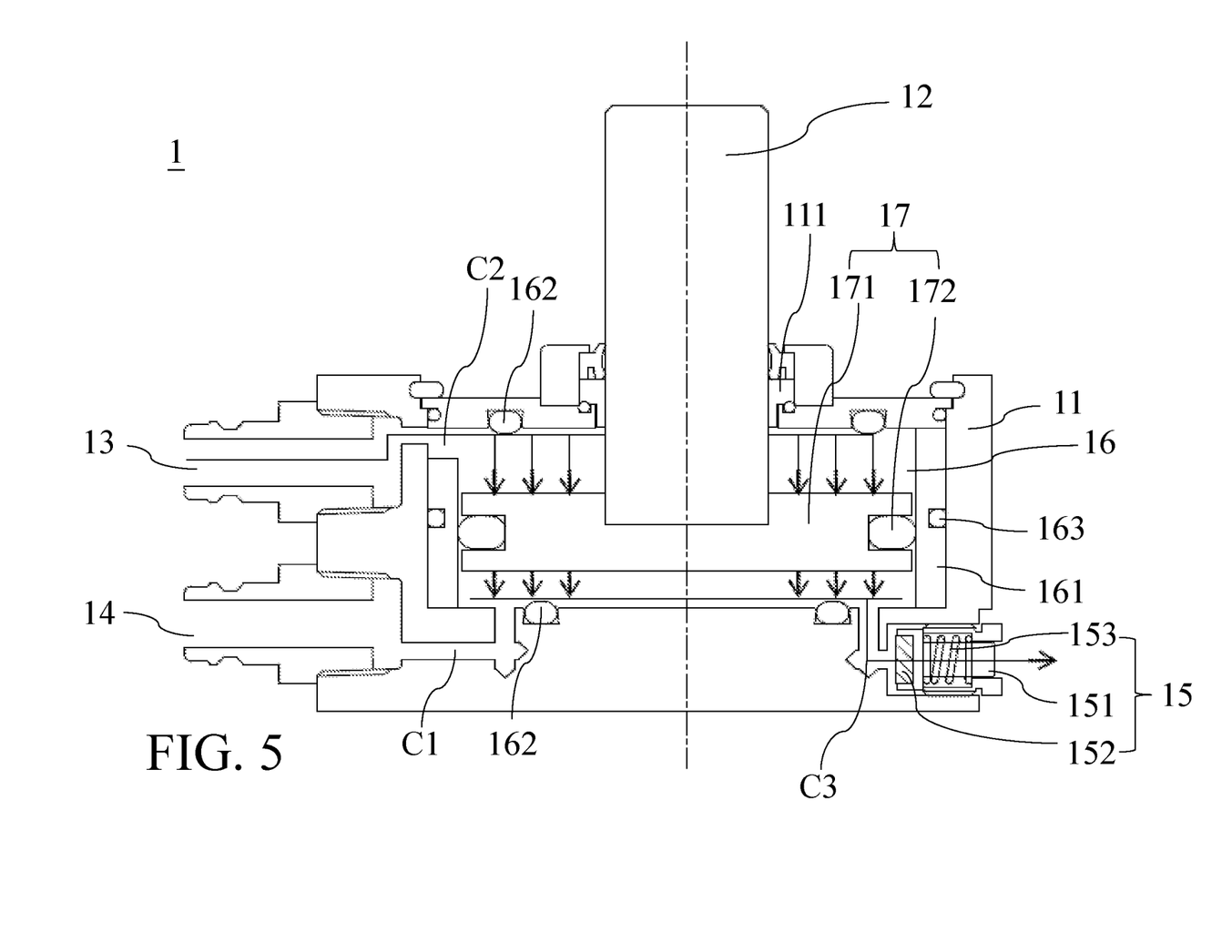
FIG. 5 is a sectional view illustrating the descending state of the connecting rod and an opening state of the pressure-relief valve during the operation of the pneumatic cylinder, according to one embodiment of the present disclosure.

As a concept of the present disclosure is described, next referring to FIG. 1~FIG. 5. FIG. 1 is a perspective view of a pneumatic cylinder 1 according to one embodiment of the present disclosure. FIG. 2 is a sectional view illustrating an ascending state of a connecting rod 12 during an operation of the pneumatic cylinder 1. FIG. 3 is a sectional view illustrating the ascending state of the connecting rod 12 and an exhaust from the pressure-relief valve 15 during the operation of the pneumatic cylinder 1. FIG. 4 is a sectional view illustrating a descending state of the connecting rod 12 during the operation of the pneumatic cylinder 1, and FIG. 5 is a sectional view illustrating the descending state of the connecting rod 12 and an opening state of the pressure-relief valve 15 during the operation of the pneumatic cylinder 1. The pneumatic cylinder 1 includes a cylinder body 11, a connecting rod 12, a pressure-relief valve 15 and a piston assembly 17, wherein the pressure-relief valve 15 is disposed in a pressure-relief opening O1 of the cylinder body 11. When an air or gas pressure within the cylinder chamber 16 of the cylinder body 11 is greater than a threshold value of the pressure-relief valve 15, the pressure-relief valve 15 allows the cylinder chamber 16 to connect to an outside of the pneumatic cylinder 1 via the pressure-relief opening O1, for relieving the air or gas within the cylinder chamber 16, such that to achieve pressure relief and prevent cylinder explosion.

In one embodiment of the present disclosure, the cylinder body 11 has an exterior that includes a first side surface and three second side surfaces corresponding to each other. The first side surface has an upper portion and a lower portion respectively disposed with two inlet-outlet passages 13, 14. In the other hand, each of the three second side surfaces has a lower portion, and the pressure-relief opening O1 is disposed on the lower portion of one of the second side surfaces of the cylinder body 11, as shown in FIG. 1. However, the present disclosure is not limited to such manner of disposing the pressure-relief opening O1 and the inlet-outlet passages 13, 14, the pressure-relief opening O1 and the inlet-outlet passages 13, 14 may be disposed on different portions of the exterior. Also, the present disclosure is not limited to such number of the pressure-relief opening O1 (also the pressure-relief valve 15) and the inlet-outlet passages 13, 14, the number thereof may be single or plural, it may be such as three pressure-relief openings O1 respectively disposed on the lower portions of the three second side surfaces of the cylinder body 11, and with three pressure-relief valves 15 respectively disposed in the three pressure-relief openings O1.

The cylinder chamber 16 formed within the cylinder body 11 is for containing the piston assembly 17. The cylinder chamber 16 is connected to the inlet-outlet passages 13, 14, through connecting holes C2, C1 respectively. It should be noted that locations and diameters of the connecting holes C2, C1 in this embodiment do not limit the present disclosure, it is only sufficient for the inlet-outlet passages 13, 14 to spatially connect to the cylinder chamber 16, and to drive the piston assembly 17 to move when taking in and exhausting the air or gas. The inlet-outlet passages 13, 14 are for taking in the air or gas to the cylinder chamber 16 or exhausting the air or gas from the cylinder chamber 16.

The piston assembly 17 includes a piston cylinder 171 and a ring seal 172. The piston cylinder 171 has a top end connected to the connecting rod 12, the connecting rod 12 extends upward from the top end of the piston cylinder 171 and protrudes out of the cylinder body 11. The ring seal 172 is disposed on a lateral surface of the piston cylinder 171 for reducing wear of the piston cylinder 171 during an operation thereof, and for preventing the cylinder chamber 16 from air or gas leakage and cylinder failure. In addition, the cylinder body 11 has an upper-inner surface and a lower-inner surface which correspond to the cylinder chamber 16, and each of which may be disposed with a piston cushion 162, for reducing wear of the piston cylinder 171 and the cylinder body 11 as the piston cylinder 171 contacts the upper-inner surface and the lower-inner surface of the cylinder body 11 during the operation.

An antiwear member 161 may be further disposed between the lateral surface of the piston cylinder 171 and an inner-lateral surface of the cylinder chamber 16 corresponding to the cylinder body 11. The antiwear member 161 may be a tube made of such as galvanized iron but not limited thereto, for reducing wear of the piston cylinder 171 during the operation. The antiwear member 161 has an outer-lateral surface further disposed with a ring seal 163, and the ring seal 163 contacts the inner-lateral surface of the cylinder body 11 corresponding to the cylinder chamber 16, such that to further improve the wear reduction of the piston cylinder 171 during the operation. Moreover, the connecting rod 12 has a bottom portion, and the cylinder body 11 is disposed with a lubricating member 111 therein and on a lateral surface of the bottom portion of the connecting rod 12, such that for lubricating the connecting rod 12 and preventing the wear thereof, thereby the connecting rod 12 may stably ascend or descend.

The pressure-relief valve 15 includes a shaft 151, a flexible block 152 and a resilient member 153. The shaft 151 is connected to the flexible block 152, and the resilient member 153 is disposed to surround the shaft 151 for providing an elastic force to the flexible block 152 to block a connecting hole C3, wherein the connecting hole C3 interconnects the pressure-relief valve 15 and the cylinder chamber 16. Such that, by virtue of the elastic force from the resilient member 153, when the air or gas pressure within the cylinder chamber 16 is less than the threshold value, the flexible block 152 which is connected to the cylinder chamber 16 through the connecting hole C3, which can block the cylinder chamber 16 from connecting to the outside. When the air or gas pressure within the cylinder chamber 16 is greater than the threshold value, the flexible block 152 overcomes the elastic force of the resilient force 153 to cause the flexible block 152 to deform, thereby a gap space is created in the pressure-relief opening O1 and allows the cylinder chamber 16 to connect to the outside, hence to perform pressure relief for the cylinder chamber 16 and prevent the cylinder explosion. The flexible block 152 may be a rubber pad, however the present disclosure is not limited thereto.

Referring to FIG. 2 and FIG. 3, when the connecting rod 12 ascends, the inlet-outlet passage 14 takes in air of gas to lift up the connecting rod 12 and the piston assembly 17. In the other hand, the inlet-outlet passage 13 that does not take in the air or gas can exhaust a part of the air or gas. When the air or gas pressure within the cylinder chamber 16 is greater than the threshold value and a large amount of the air or gas cannot exhaust from the inlet-outlet passages 13 fast enough, the pressure-relief valve 15 starts to work and allows the cylinder chamber 16 to connect to the outside, hence to perform the pressure relief for the cylinder chamber 16 and to prevent the cylinder explosion.

Referring to FIG. 4 and FIG. 5, when the connecting rod 12 descends, the inlet-outlet passage 13 takes in the air or gas to press down the connecting rod 12 and the piston assembly 17. In the other hand, the inlet-outlet passage 14 does not take in air or gas can exhaust a part of the air or gas out. However, when the air or gas pressure within the cylinder chamber 16 is greater than the threshold value and a large amount of the air or gas cannot exhaust from the inlet-outlet passages 14 fast enough, the pressure-relief valve 15 starts to work and allows the cylinder chamber 16 to connect to the outside, hence to perform the pressure relief for the cylinder chamber 16 and to prevent the cylinder explosion.

Figure 6:
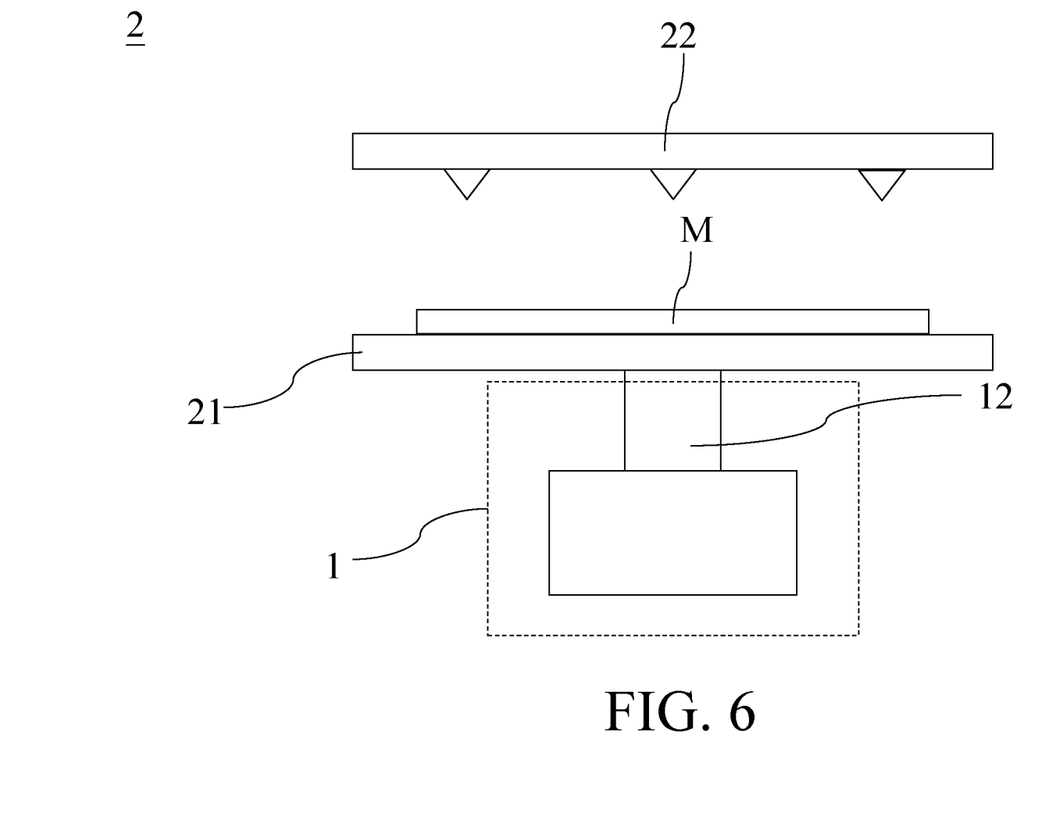
FIG. 6 is a schematic sectional view of a mechanical apparatus according to one embodiment of the present disclosure.

On next referring to FIG. 6, which is a sectional view of a mechanical apparatus 2 according to one embodiment of the present disclosure. The mechanical apparatus 2 includes the pneumatic cylinder 1, a bearer 21 and a work tool 22, wherein the work tool 22 is replaceable by other components such a power transfer unit or a motor, etc. The connecting rod 12 of the pneumatic cylinder 1 is connected to the bearer 21. In this embodiment, the bearer 21 is a carrier placed with a material M thereon. By virtue of the connecting rod 12 of the pneumatic cylinder 1, which moves the bearer 21 to ascend and descend, thereby the work tool 22 can process the material M.

In summary of the description above, the pneumatic cylinder and the mechanical apparatus using the pneumatic cylinder, which have the pressure-relief valve disposed within the pressure-relief opening on the exterior of the pneumatic cylinder, thereby when the air or gas pressure within of the cylinder chamber reaches the threshold value, the pneumatic cylinder can perform pressure relief to prevent the cylinder chamber from suffering excessive air or gas pressure and cylinder explosion. Hence, the present disclosure can effectively prevent cylinder explosion which can lead to machine failure, furthermore to improve a safety of users, to protect the users from getting injured by the explosion.

The above disclosure is only the preferred embodiment of the present disclosure, and not used for limiting the scope of the present disclosure. All equivalent variations and modifications on the basis of shapes, structures, features and spirits described in claims of the present disclosure should be included in the claims of the present disclosure.

We claim:

1. A pneumatic cylinder, comprising:
    a cylinder body formed with a cylinder chamber therein, and having an exterior that is disposed with at least one inlet-outlet passage and at least one pressure-relief opening, wherein the least one inlet-outlet passage is connected to the cylinder chamber;
    a piston assembly contained within the cylinder chamber;
    a connecting rod connected to the piston assembly and protruding out from the cylinder body; and
    at least one pressure-relief valve disposed in the at least one pressure-relief opening and having two ends that are connected to an outside of the pneumatic cylinder and the cylinder chamber respectively, wherein when a gas pressure of the cylinder chamber is greater than a threshold value of the at least one pressure-relief valve, the at least one pressure-relief valve works to allow the cylinder chamber to connect to the outside for pressure relief, wherein the exterior of the cylinder body comprises a first side surface and three second side surfaces corresponding to each other, the at least one inlet-outlet passage is two respectively disposed on an upper portion and a lower portion of the first side surface of the cylinder body, and the at least one pressure-relief opening is disposed on a lower portion of one of the second side surfaces of the cylinder body.

2. The pneumatic cylinder according to claim 1, wherein the at least one pressure-relief valve comprises a shaft, a flexible block and a resilient member, the flexible block is connected to an end of the shaft that is connected to an end of the cylinder chamber, and the resilient member is disposed to surround the shaft for providing an elastic force to the flexible block.

3. The pneumatic cylinder according to claim 1, wherein the connecting rod has a bottom portion, the cylinder body is disposed with a lubricating member therein and on a lateral surface of the bottom portion of the connecting rod, for lubricating the connecting rod and for preventing wear thereof, thereby allowing the connecting rod to stably ascend or descend.

4. The pneumatic cylinder according to claim 1, further comprising an antiwear member that is disposed between a lateral surface of the piston assembly and an inner-lateral surface of the cylinder body corresponding to the cylinder chamber, for reducing wear of the piston assembly during an operation thereof.

5. The pneumatic cylinder according to claim 1, wherein the piston assembly comprises a piston cylinder and a ring seal, the piston cylinder has a top end connected to the connecting rod, the connecting rod extends upward from the top end of the piston cylinder and protrudes out of the cylinder body, and the ring seal is disposed on a lateral surface of the piston cylinder for reducing wear of the piston cylinder during an operation thereof.

6. The pneumatic cylinder according to claim 5, wherein the cylinder body has an upper-inner surface and a lower-inner surface corresponding to the cylinder chamber, each of the upper-inner surface and the lower-inner surface is disposed with a piston cushion, for reducing wear of the piston cylinder and the cylinder body when the piston cylinder contacts the upper-inner surface or the lower-inner surface of the cylinder body.

7. The pneumatic cylinder according to claim 1, wherein the cylinder body is disposed with a plurality of connecting holes, to allow the cylinder chamber, the inlet-outlet passages and an end of the at least one pressure-relief valve to connect to each other.

8. A mechanical apparatus, comprising the pneumatic cylinder according to claim 1, and a bearer connected to the connecting rod of the pneumatic cylinder.

9. The mechanical apparatus according to claim 8, further comprising a work tool for processing a material on the bearer.

10. A pneumatic cylinder, comprising:
a cylinder body formed with a cylinder chamber therein, and having an exterior that is disposed with at least one inlet-outlet passage and at least one pressure-relief opening, wherein the least one inlet-outlet passage is connected to the cylinder chamber;
a piston assembly contained within the cylinder chamber;
a connecting rod connected to the piston assembly and protruding out from the cylinder body; and
at least one pressure-relief valve disposed in the at least one pressure-relief opening and having two ends that are connected to an outside of the pneumatic cylinder and the cylinder chamber respectively, wherein when a gas pressure of the cylinder chamber is greater than a threshold value of the at least one pressure-relief valve, the at least one pressure-relief valve works to allow the cylinder chamber to connect to the outside for pressure relief, wherein the exterior of the cylinder body comprises a first side surface and three second side surfaces corresponding to each other, the at least one inlet-outlet passage is two respectively disposed on an upper portion and a lower portion of the first side surface of the cylinder body, each of the second side surfaces has a lower portion, and the at least one pressure-relief opening is three respectively disposed on the lower portions of the second side surfaces of the cylinder body.

11. The pneumatic cylinder according to claim 10, wherein the at least one pressure-relief valve comprises a shaft, a flexible block and a resilient member, the flexible block is connected to an end of the shaft that is connected to an end of the cylinder chamber, and the resilient member is disposed to surround the shaft for providing an elastic force to the flexible block.

12. The pneumatic cylinder according to claim 10, wherein the connecting rod has a bottom portion, the cylinder body is disposed with a lubricating member therein and on a lateral surface of the bottom portion of the connecting rod, for lubricating the connecting rod and for preventing wear thereof, thereby allowing the connecting rod to stably ascend or descend.

13. The pneumatic cylinder according to claim 10, further comprising an antiwear member that is disposed between a lateral surface of the piston assembly and an inner-lateral surface of the cylinder body corresponding to the cylinder chamber, for reducing wear of the piston assembly during an operation thereof.

14. The pneumatic cylinder according to claim 10, wherein the piston assembly comprises a piston cylinder and a ring seal, the piston cylinder has a top end connected to the connecting rod, the connecting rod extends upward from the top end of the piston cylinder and protrudes out of the cylinder body, and the ring seal is disposed on a lateral surface of the piston cylinder for reducing wear of the piston cylinder during an operation thereof.

15. The pneumatic cylinder according to claim 14, wherein the cylinder body has an upper-inner surface and a lower-inner surface corresponding to the cylinder chamber, each of the upper-inner surface and the lower-inner surface is disposed with a piston cushion, for reducing wear of the piston cylinder and the cylinder body when the piston cylinder contacts the upper-inner surface or the lower-inner surface of the cylinder body.

16. The pneumatic cylinder according to claim 10, wherein the cylinder body is disposed with a plurality of connecting holes, to allow the cylinder chamber, the inlet-outlet passages and an end of the at least one pressure-relief valve to connect to each other.

\* \* \* \* \*